US012715119B2

(12) United States Patent
Utsumi et al.

(10) Patent No.: US 12,715,119 B2
(45) Date of Patent: Aug. 25, 2026

(54) TEACHING TOOL, AND TEACHING DEVICE FOR USING OPERATOR'S HAND TO SET TEACHING POINT

(71) Applicant: FANUC CORPORATION, Yamanashi (JP)

(72) Inventors: Ryuunosuke Utsumi, Yamanashi (JP); Shigeo Yoshida, Yamanashi (JP); Yasuhiro Amagata, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 135 days.

(21) Appl. No.: 18/262,376

(22) PCT Filed: Mar. 7, 2022

(86) PCT No.: PCT/JP2022/009812

§ 371 (c)(1),
(2) Date: Jul. 20, 2023

(87) PCT Pub. No.: WO2022/191148

PCT Pub. Date: Sep. 15, 2022

(65) Prior Publication Data

US 2024/0083022 A1 Mar. 14, 2024

(30) Foreign Application Priority Data

Mar. 11, 2021 (JP) ................................ 2021-039318

(51) Int. Cl.
*G05B 19/00* (2006.01)
*B25J 9/00* (2006.01)
(Continued)

(52) U.S. Cl.
CPC ............ *B25J 9/163* (2013.01); *G05B 19/423* (2013.01)

(58) Field of Classification Search
CPC ............................... B25J 9/163; G05B 19/423
See application file for complete search history.

(56) References Cited

U.S. PATENT DOCUMENTS 10,882,189 B2 1/2021 Matsuura et al.
2014/0201112 A1* 7/2014 Sawada .................. G06N 20/00 901/4

(Continued)

FOREIGN PATENT DOCUMENTS

CN 110116116 A 8/2019
CN 110170995 A 8/2019

(Continued)

*Primary Examiner* — Aaron G Cain
(74) *Attorney, Agent, or Firm* — HAUPTMAN HAM, LLP

(57) ABSTRACT

A robot control device is provided with a camera which images a teaching tool which includes a characteristic area, and a characteristic position detection unit which detects the position of the characteristic area. The robot control device includes a movement instruction generating unit which, when an operator has moved the teaching tool, changes the position and orientation of the robot such that the camera follows the characteristic area. The robot control device includes a calculation unit which, on the basis of the position of the characteristic area, calculates the position and orientation of an auxiliary coordinate system set for the teaching tool. The robot control device includes a setting unit which, on the basis of the position and orientation of the auxiliary coordinate system, sets the position of the teaching point and the orientation of the robot at the teaching point.

6 Claims, 14 Drawing Sheets

(51) Int. Cl.
*B25J 9/16* (2006.01)
*G05B 19/423* (2006.01)

(56) References Cited

U.S. PATENT DOCUMENTS

| | | | | |
|---|---|---|---|---|
| 2015/0081098 | A1* | 3/2015 | Kogan | B25J 13/085 901/46 |
| 2018/0304467 | A1* | 10/2018 | Matsuura | B25J 13/06 |
| 2019/0047145 | A1 | 2/2019 | Akeel et al. | |

FOREIGN PATENT DOCUMENTS

| | | | |
|---|---|---|---|
| DE | 112016006116 | T5 | 9/2018 |
| DE | 102019002065 | A1 | 10/2019 |
| JP | H05-023983 | A | 2/1993 |
| JP | H07-129231 | A | 5/1995 |
| JP | H08-001563 | A | 1/1996 |
| JP | 2011-104759 | A | 6/2011 |
| JP | 2011-110620 | A | 6/2011 |
| JP | 2014-136275 | A | 7/2014 |
| JP | 2018144148 | A | 9/2018 |

* cited by examiner

TEACHING TOOL, AND TEACHING DEVICE FOR USING OPERATOR'S HAND TO SET TEACHING POINT

RELATED APPLICATIONS

The present application is a National Phase of International Application No. PCT/JP2022/009812 filed Mar. 7, 2022, which claims priority to Japanese Application No. 2021-039318, filed Mar. 11, 2021.

TECHNICAL FIELD

The present invention relates to a teaching apparatus for setting a teaching point by using a teaching tool or a hand of an operator.

RELATED ART

A robot apparatus includes a robot, an operation tool attached to the robot, and a controller configured to control the robot. The controller drives the robot and the operation tool based on a work program. An operator can teach a teaching point in advance in order to determine a position and an orientation of the robot. The work program includes information on the position of the teaching point and the orientation of the robot at the teaching point.

In the related art, an operator operates a teach pendant and changes the position and the orientation of the robot such that the operation tool is in the desired position and orientation. The teaching point can then be set when the position and the orientation of the robot are in the desired position and orientation.

It is also known a method to perform teaching work by using a tool for teaching configured to indicate the position and the orientation of the operation tool. In this method, an image of a tool for teaching is captured with a stereo camera fixed in a predetermined position. The position and the orientation of the tool for teaching is detected based on the image captured by the stereo camera. The position and the orientation of the robot are then set based on the position and the orientation of the tool for teaching (e.g., Japanese Unexamined Patent Publication No. 2014-136275A and Japanese Unexamined Patent Publication No. 2011-104759A).

CITATION LIST

Patent Literature

[PTL 1] Japanese Unexamined Patent Publication No. 2014-136275A

[PTL 2] Japanese Unexamined Patent Publication No. 2011-104759A

SUMMARY OF INVENTION

Technical Problem

When an operator sets a teaching point, an operator needs to change a position and an orientation of a robot for each teaching point by operating a teach pendant. This leads to a problem in that it takes a long operation time for setting the teaching point.

For example, when setting a teaching point in a robot apparatus that conveys a workpiece, the position and the orientation of the robot must be manually adjusted. Since a large number of teaching points have to be set, there is a problem in that the operation time becomes long. In particular, when a path for moving the workpiece includes a curve, it is necessary to set many teaching points in order to move the workpiece along a desired path. Even for a robot apparatus that performs operation other than conveyance of a workpiece, there are cases where many teaching points are set in order to generate a work program, which causes a problem in that the operation time becomes long.

In addition, an operation tool may enter into a space enclosed by a housing or the like, or a narrow area and perform operation. In such a case, when setting a teaching point of the robot, the operator may have difficulty viewing the operation tool. As a result, it can be difficult to check the position and the orientation of the operation tool.

For example, a machine tool includes a housing constituting a machining chamber that prevents the scattering of cutting fluid. A workpiece may be arranged inside a machining chamber by a robot. When setting the teaching point for such a robot apparatus, there is a problem in that an operator has difficulty checking the position and the orientation of the operation tool that has entered inside the housing. This leads to the problem wherein it takes a long time to set a teaching point.

Solution to Problem

One aspect of the present disclosure is a teaching apparatus configured to set a teaching point of a robot apparatus including a robot and an operation tool. The teaching apparatus includes a three-dimensional sensor configured to capture an image of a teaching tool or a hand of an operator for indicating a position of a teaching point and an orientation of the robot at the teaching point, and a processing apparatus configured to process a signal from the three-dimensional sensor. The processing apparatus includes a feature portion detecting unit configured to detect a position of a feature portion in the teaching tool or the hand of the operator based on the output of the three-dimensional sensor. The processing apparatus includes a movement command generation unit configured to generate a command for changing a position and an orientation of the robot such that a position and an orientation of the three-dimensional sensor with respect to the feature portion is maintained when the operator moves the teaching tool or the hand. The processing apparatus includes a calculating unit configured to calculate a position and an orientation of an auxiliary coordinate system preset in the teaching tool or the hand of the operator based on a position of the feature portion detected by the feature portion detecting unit in a state where the operator arranges the teaching tool or the hand so as to correspond to the position and the orientation of the robot at the time when the robot apparatus performs an operation. The processing apparatus includes a setting unit configured to set a position of a teaching point and an orientation of the robot at the teaching point based on the position and the orientation of the auxiliary coordinate system calculated by the calculating unit.

Advantageous Effect of Invention

According to the aspect of the present disclosure, it is possible to provide a teaching apparatus that can perform teaching work in a short time.

DESCRIPTION OF EMBODIMENTS

A teaching apparatuses according to an embodiment will be described with reference to FIGS. 1 to 14. In the present embodiments, a robot apparatus including a robot that conveys the workpiece from a start position to a target position will be described by way of example.

Figure 1:
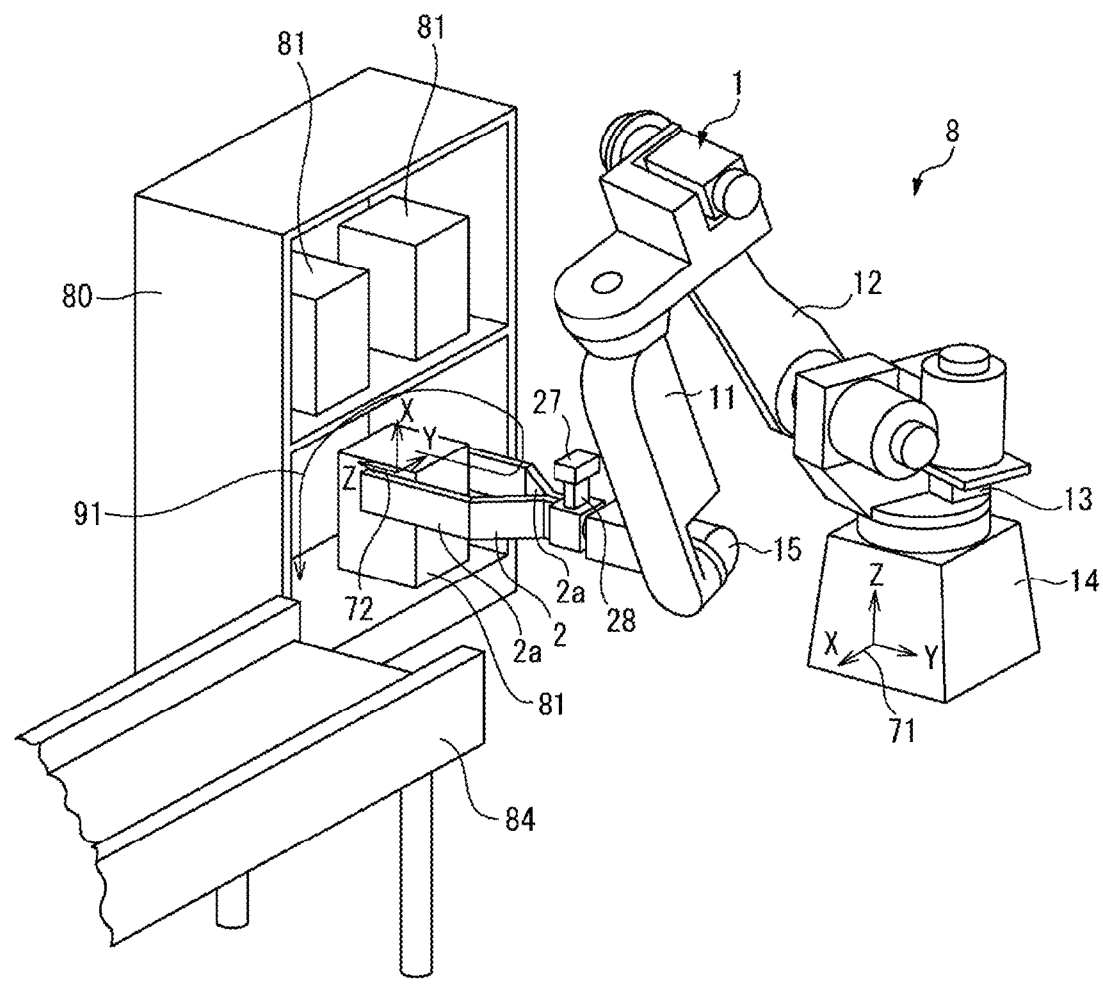
FIG. 1 is a perspective view when a first robot apparatus according to an embodiment starts conveying a workpiece.
Figure 2:
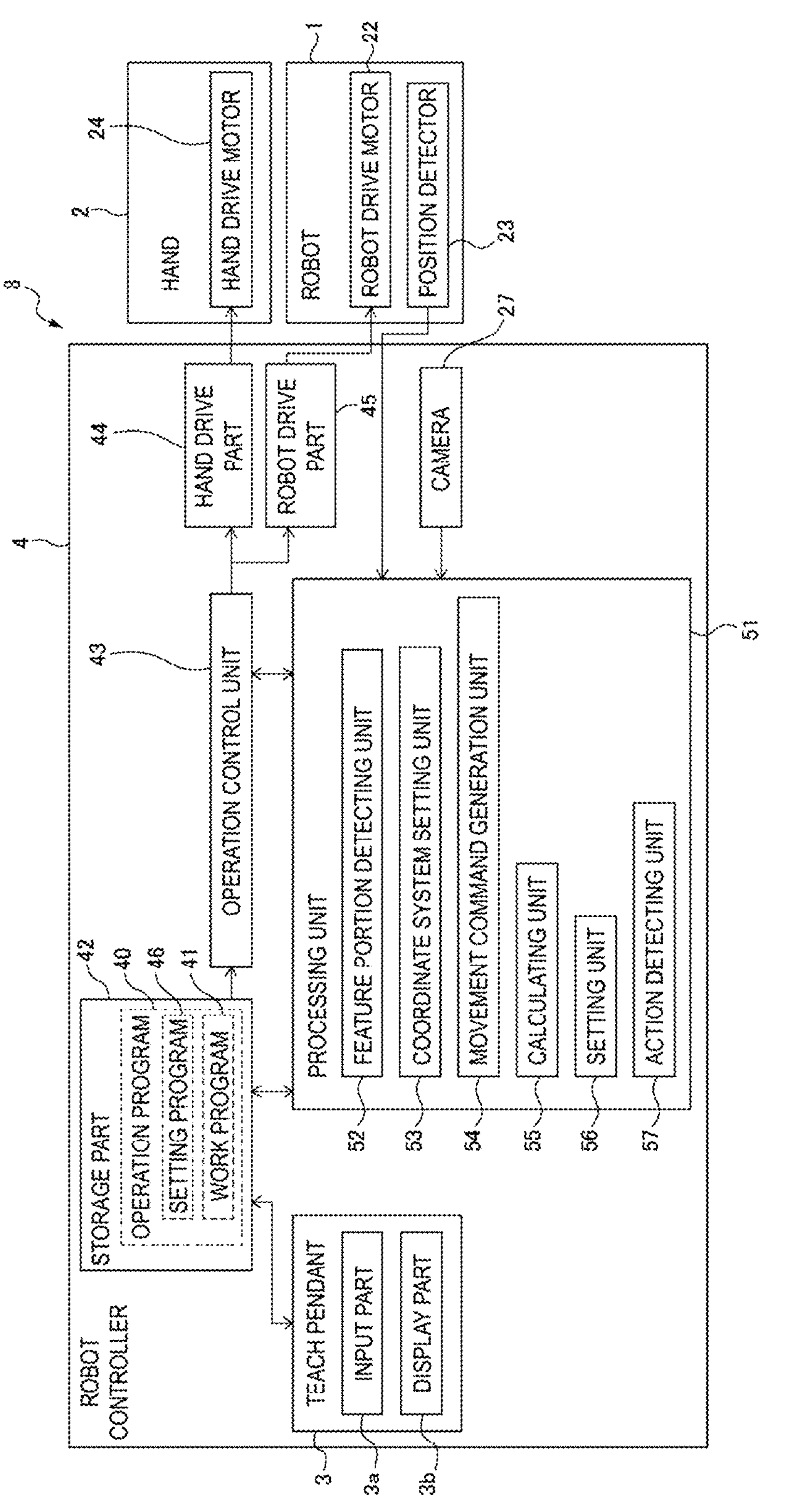
FIG. 2 is a block diagram of the first robot apparatus according to an embodiment.

FIG. 1 is a perspective view of a first robot apparatus according to the present embodiment. FIG. 2 is a block diagram of a robot apparatus according to the present embodiment. FIG. 1 is a perspective view of starting conveyance of a workpiece 81. Referring to FIGS. 1 and 2, a robot apparatus 8 includes a hand 2 serving as an operation tool and a robot 1 configured to move the hand 2. The robot apparatus 8 includes a conveyor 84 that conveys the workpiece 81. A first robot apparatus 8 conveys the workpiece 81 having a rectangular parallelepiped shape from a shelf 80 to the conveyor 84 as illustrated by an arrow 91.

Figure 3:
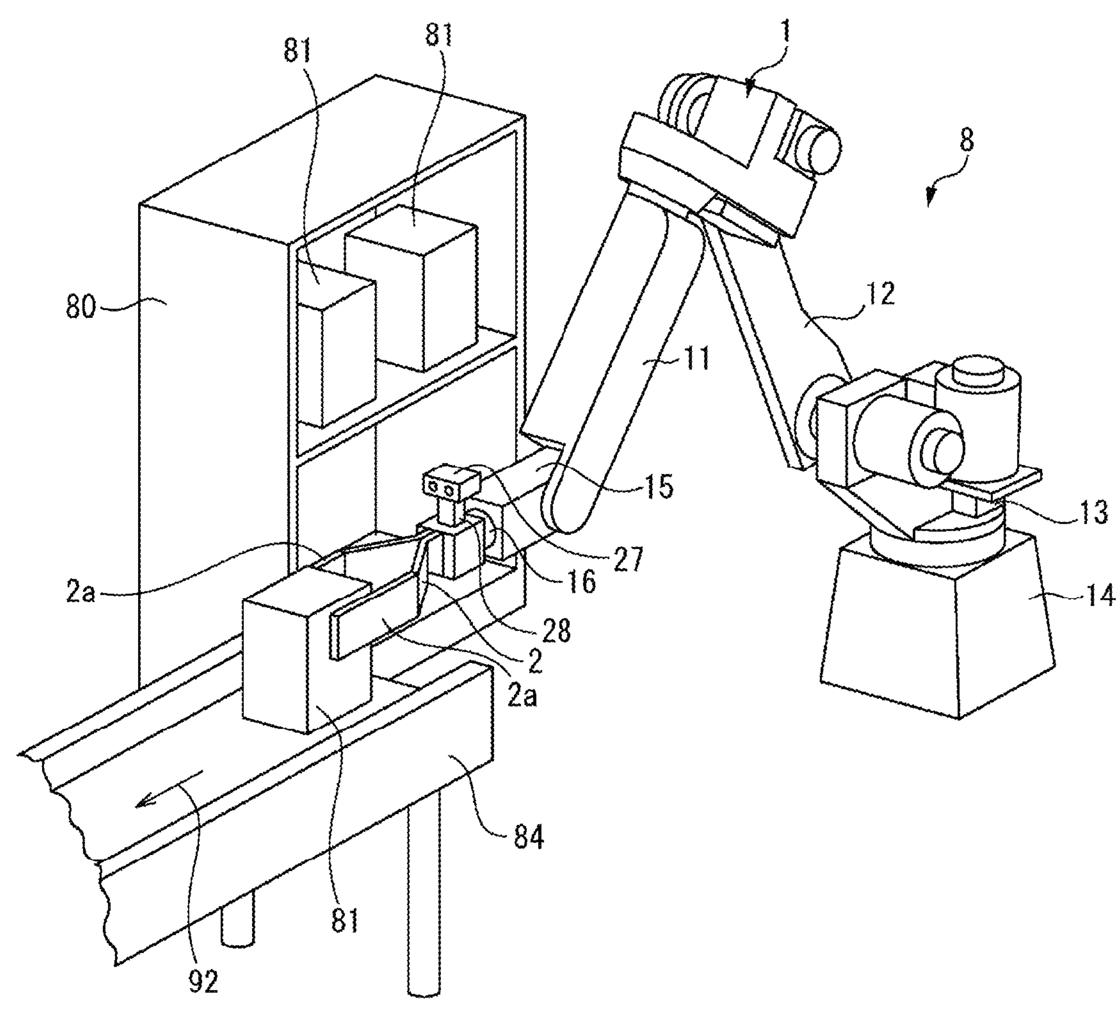
FIG. 3 is a perspective view when the first robot apparatus finishes conveying a workpiece.

FIG. 3 is another perspective view of the first robot apparatus according to the present embodiment. FIG. 3 is a perspective view when conveyance of the workpiece 81 is finished. When the robot 1 has finished conveyance of the workpiece, the conveyor 84 moves the workpiece 81 to a predetermined position as illustrated by an arrow 92.

Referring to FIGS. 1 to 3, the robot 1 in the present embodiment is an articulated robot including a plurality of joints. The robot 1 includes a base 14 and a turning base 13 supported by the base 14. The turning base 13 rotates with respect to the base 14. The robot 1 includes an upper arm 11 and a lower arm 12. The lower arm 12 is supported by the turning base 13 through a joint. The upper arm 11 is supported by the lower arm 12 through a joint. The robot 1 includes a wrist 15 coupled to the end portion of the upper arm 11. The wrist 15 is supported by the upper arm 11 through a joint. The wrist 15 includes a flange 16 formed to rotate.

The hand 2 is formed to grip a workpiece 81. The hand 2 of the present embodiment includes two claw parts **2*a* configured to move in opposite directions to each other. The hand 2 is fixed to the flange 16 of the wrist 15**. The operation tool is not limited to the hand, and any apparatus can be adopted according to the operation performed by the robot apparatus. For example, when applying an adhesive, an operation tool such as a dispenser can be adopted as an operation tool.

The robot 1 includes a robot drive apparatus configured to drive a component of the robot 1, such as the upper arm 11. The robot drive apparatus of the present embodiment includes a plurality of robot drive motors 22 configured to drive the upper arm 11, the lower arm 12, the turning base 13, and the wrist 15. The hand 2 includes a hand drive apparatus configured to drive the hand 2. The hand drive apparatus of the present embodiment includes a hand drive motor 24 configured to open and close the claw parts **2*a***.

The robot apparatus 8 includes a robot controller 4 configured to control the robot 1 and the hand 2. The robot controller 4 includes an arithmetic processing apparatus (computer) including a Central Processing Unit (CPU) serving as a processor. The arithmetic processing apparatus includes a Random Access Memory (RAM) and a Read Only Memory (ROM), or the like, connected to the CPU via a bus.

The robot controller 4 includes a teach pendant 3 serving as an operation panel by which the operator manually operates the robot apparatus 8. The teach pendant 3 includes an input part **3*a* configured to enter information on the robot 1 and the hand 2. The input part 3*a* is constituted of a keyboard, a dial, and other components. The teach pendant 3 includes a display part 3*b* configured to display information on the control of the robot apparatus 8. The display part 3*b* is constituted of a display panel such as a liquid crystal display panel. The display part 3*b* may include a touch-panel-type display panel. In this case, the display part 3*b* has a function of the input part 3*a***.

The robot controller 4 drives the robot 1 and the hand 2 according to an operation program 40. The operation program 40 of the present embodiment includes a work program 41 for performing a predetermined operation such as conveyance of a workpiece. The robot controller 4 changes the position and the orientation of the robot 1 based on the teaching points determined in the work program 41 when the actual operation is performed by the robot apparatus 8. The robot controller 4 includes a storage part 42 that stores information on the control of the robot apparatus 8. The storage part 42 may be formed by a non-transitory storage media that can store information. For example, the storage part 42 can be constituted of a storage medium such as a volatile memory, a nonvolatile memory, a magnetic storage medium, or an optical storage medium. The operation program 40 is stored in the storage part 42. In the work program 41, the position of the teaching point for driving the robot 1 and the orientation of the robot 1 at the teaching point are determined.

The robot controller 4 includes an operation control unit 43 configured to send operation commands for the robot 1 and the hand 2. The operation control unit 43 corresponds to a processor driven according to the operation program 40. The processor functions as the operation control unit 43 by reading the operation program 40 and performing the controls determined in the operation program 40. The processor also functions as the operation control unit 43 by driving the robot 1 and the hand 2 based on a command from the processing unit 51.

The operation control unit 43 sends, to a robot drive part 45, an operation command for driving the robot 1. The robot drive part 45 includes an electric circuit configured to drive a robot drive motor 22. The robot drive part 45 supplies electricity to the robot drive motor 22 based on the operation command. Further, the operation control unit 43 sends, to a hand drive part 44, an operation command for driving the hand 2 based on the work program 41. The hand drive part 44 supplies electricity to the hand drive motor 24 based on the operation command.

The robot 1 includes a state detector configured to detect the position and the orientation of the robot 1. The state detector according to the present embodiment includes a position detector 23 attached to the robot drive motor 22. Based on the outputs of a plurality of position detectors 23, the position and the orientation of the robot 1 are detected.

A world coordinate system 71 is set for the robot apparatus 8 in the present embodiment. In the first robot apparatus 8, the origin of the world coordinate system 71 is arranged at the base 14 of the robot 1. The world coordinate system 71 is also referred to as the reference coordinate system of the robot apparatus 8. The world coordinate system 71 is a coordinate system in which the position of the origin is fixed and each direction of the coordinate axes is fixed. The world coordinate system 71 includes X-axis, Y-axis, and Z-axis orthogonal to each other as the coordinate axes. Additionally, the W-axis is set as a coordinate axis around the X-axis. A P-axis is set as a coordinate axis around the Y-axis. An R-axis is set as a coordinate axis around the Z-axis.

In the present embodiment, a tool coordinate system with an origin set at an any position of the operation tool is set. The origin of a tool coordinate system 72 of the present embodiment is set at the tool center point. In the tool center point setting of the present embodiment, the center point in the height direction is set at the tips of the two claw parts 2*a*. Then, the midpoint in the straight line connecting each center point of the two claw parts 2*a* is set as the tool center point. The tool coordinate system 72 includes X-axis, Y-axis, and Z-axis orthogonal to each other as coordinate axes. In addition, the tool coordinate system 72 includes a W-axis around the X-axis, a P-axis around the Y-axis, and an R-axis around the Z-axis.

As the position and the orientation of the robot 1 change, the position of the origin and the direction of the tool coordinate system 72 change. For example, the position of the robot 1 corresponds to the position of the tool center point (position of the origin of the tool coordinate system 72). In addition, the orientation of the robot 1 corresponds to the direction of the tool coordinate system 72 with respect to the world coordinate system 71.

The robot apparatus 8 of the present embodiment includes a teaching apparatus configured to set the teaching point of the robot apparatus 8. In the present embodiment, the robot controller 4 functions as a teaching apparatus. The teaching apparatus includes a camera 27 serving as a three-dimensional sensor that captures an image of a teaching tool or an image of the hand of the operator. The camera 27 of the present embodiment is a stereo camera that can detect the three-dimensional position of an object based on images captured by two two-dimensional cameras.

The parallax of the positions of the object in the image captured by one of the two-dimensional cameras and the image captured by the other one of the two-dimensional cameras is calculated. Based on this parallax, the distance from the stereo camera to the object at a measurement point set on the surface of the object is calculated. Furthermore, the three-dimensional position of the measuring point can be calculated based on the position and the orientation of the camera 27.

The three-dimensional sensor is not limited to a stereo camera, any sensor that can detect the feature portion of an object (teaching tool or hand of operator) that specifies the position and the orientation of the operation tool can be used. For example, as a three-dimensional sensor, a Time of Flight (TOF) camera that captures distance images by an optical time-of-flight method can be adopted.

The camera 27 according to the present embodiment is supported by the robot 1. The camera 27 is fixed to the hand 2 via a support member 28. The camera 27 changes the position and the orientation together with the hand 2. The camera 27 can acquire position information of a measurement point on the surface of an object in a predetermined capturing range. for example, the camera 27 can capture a distance image in the capturing range based on the position information of a three-dimensional measurement point.

The teaching apparatus of the present embodiment includes a processing apparatus configured to process signals from the camera 27. The robot controller 4 includes a processing unit 51 configured to process the output of the camera 27 and set the teaching point. In the present embodiment, the processing unit 51 of the robot controller 4 functions as a processing apparatus. Furthermore, the processing unit 51 sends a command, to the camera 27, for capturing an image. The operation program 40 of the present embodiment includes a setting program 46 for performing control for setting the teaching point. The processing apparatus is driven based on the setting program 46. The setting program 46 is created in advance and stored in the storage part 42.

The processing unit 51 includes a feature portion detecting unit 52 configured to detect the position of the feature portion in the teaching tool or the hand of the operator based on the output of the camera 27. The processing unit 51 includes a coordinate system setting unit 53 configured to set the auxiliary coordinate system in the teaching tool or the hand of the operator. The processing unit 51 includes a movement command generation unit 54 configured to generate a command for changing the position and the orientation of the robot 1 so as to maintain the position and the orientation of the camera 27 with respect to the feature portion.

The teaching tool or the hand of the operator is set in advance with the auxiliary coordinate system. The processing unit 51 includes a calculating unit 55 configured to calculate the position and the orientation of the auxiliary coordinate system based on the position of the feature portion detected by the feature portion detecting unit 52. The processing unit 51 includes a setting unit 56 serving as a teaching point setting unit configured to set the teaching point so as to include information on the position of the teaching point and the orientation of the robot at the teaching point, based on the position and the orientation of the auxiliary coordinate system calculated in the calculating unit 55.

Each unit of the processing unit 51, the feature portion detecting unit 52, the coordinate system setting unit 53, the movement command generation unit 54, the calculating unit 55, and the setting unit 56 corresponds to a processor that is driven according to the setting program 46. The processor functions as each unit by reading the setting program 46 and performing the control defined in the setting program 46.

Figure 4:
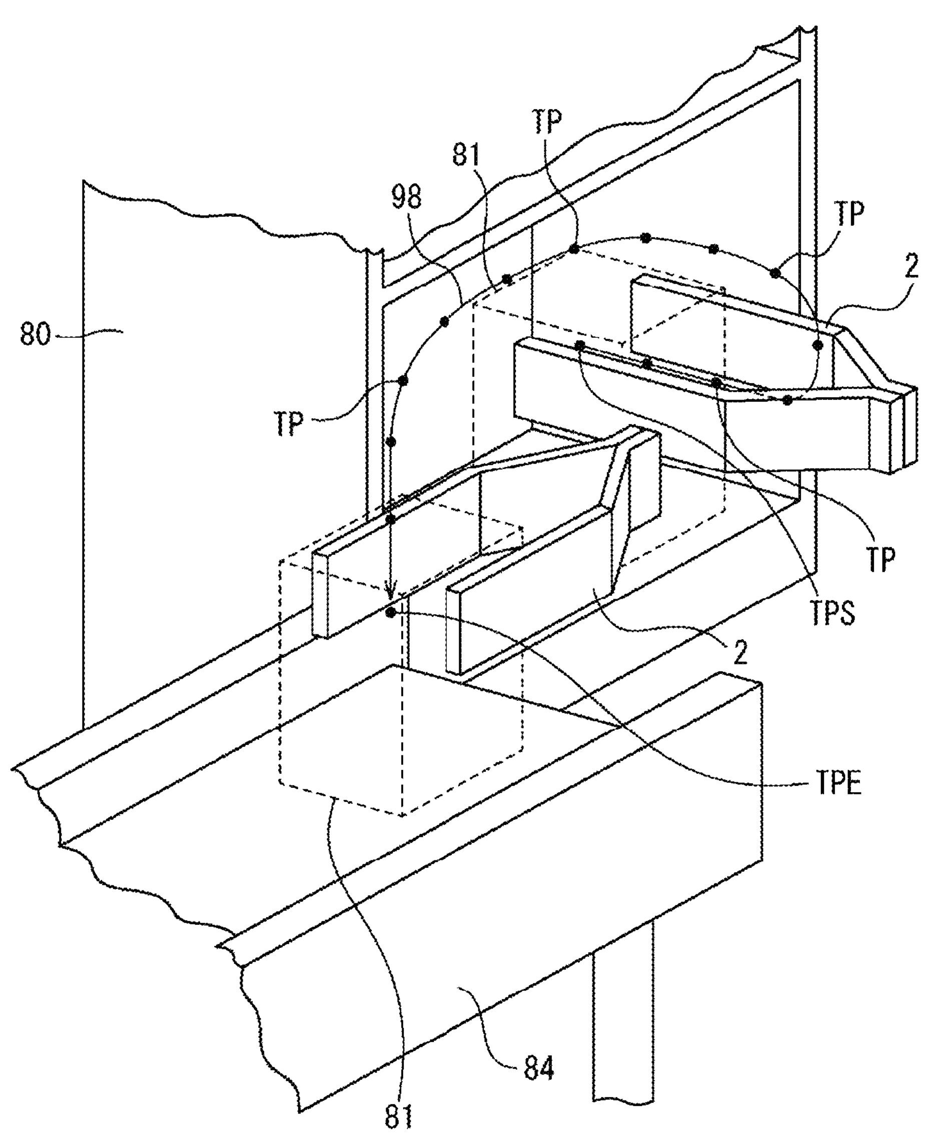
FIG. 4 is a perspective view illustrating a movement path of a position of a robot when it conveys a workpiece.

FIG. 4 illustrates a perspective view that describes a movement path of the robot according to the present embodiment. The position of the robot 1 moves along a movement path 98. In other words, the tool center point of the robot 1 moves along the movement path 98. As the position of the robot 1 moves, the orientation of the robot 1 also changes together. In the present embodiment, the position and the orientation of the robot 1 are changed such that the workpiece 81 arranged on the shelf 80 can be gripped by the hand 2. The hand 2 grips the workpiece 81. Next, the robot 1 performs an operation of pulling the workpiece 81 out of the shelf 80 while maintaining the orientation of the hand 2. Then, the robot 1 performs an operation of placing the workpiece 81 on the conveyor 84 while changing the position and the orientation of the hand 2.

The movement path 98 is determined based on a plurality of teaching points. In the example illustrated in FIG. 4, a start teaching point TPS at which conveyance of the workpiece 81 starts and an end teaching point TPE at which conveyance of the workpiece 81 ends, are illustrated. A plurality of the teaching points TP are set between the start teaching point TPS and the end teaching point TPE. In the teaching apparatus of the present embodiment, the teaching points of such the robot 1 are set.

Figure 5:
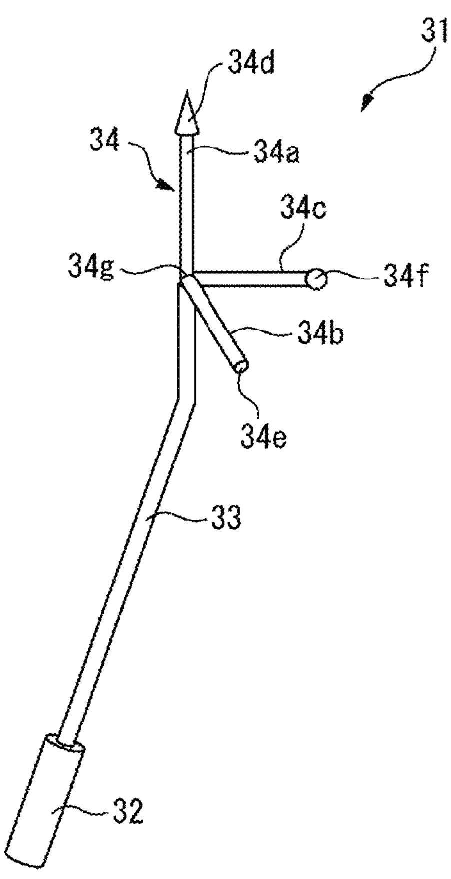
FIG. 5 is a perspective view of a first teaching tool according to an embodiment.

FIG. 5 illustrates a perspective view of a first teaching tool according to the present embodiment. In the present embodiment, an operator designates the position and the orientation of the hand 2 by using a teaching tool 31. The position and the orientation of the hand 2 correspond to the position and the orientation of the robot 1. In the present embodiment, the position of the robot 1 is the position of the tool center point. In other words, the operator designates the position of the tool center point and the orientation of the robot 1 by using the teaching tool 31.

The first teaching tool 31 has an elongated shape. The teaching tool 31 includes a gripping portion 32 for the operator to hold and a supporting portion 33 extending from the gripping portion 32. The teaching tool 31 includes an instruction portion 34 having a shape indicating the position and the orientation of the hand 2. The processing unit 51 of the robot controller 4 detects the position and the orientation of the instruction portion 34 based on the output of the camera 27. The processing unit 51 then sets the position of the teaching point and the orientation of the robot 1 at the teaching point based on the position and the orientation of the instruction portion 34. The instruction portion 34 is arranged at the tip of the supporting portion 33.

The instruction portion 34 has a three-dimensional shape by which the position and the orientation of the instruction portion 34 can be detected based on the output of the camera 27. The instruction portion 34 of the first teaching tool 31 includes rod-like portion **34*a*, 34*b*, and 34*c* extending perpendicular to each other. At the tip of a rod-like portion 34*a*, a feature portion 34*d* having a conical shape is formed. The end face at the tip of a rod-like portion 34*b* constitutes a feature portion 34*e*. A feature portion 34*f* having a spherical shape is formed at the tip of a rod-like portion 34*c*. In this way, feature portions 34*d*, 34*e*, and 34*f* having different shapes each other are formed at the tips of the rod-like portion 34*a*, 34*b*, and 34*c*, respectively. A reference portion where the rod-like portions 34*a*, 34*b*, and 34*c* intersect with each other constitutes a feature portion 34*g***.

Figure 6:
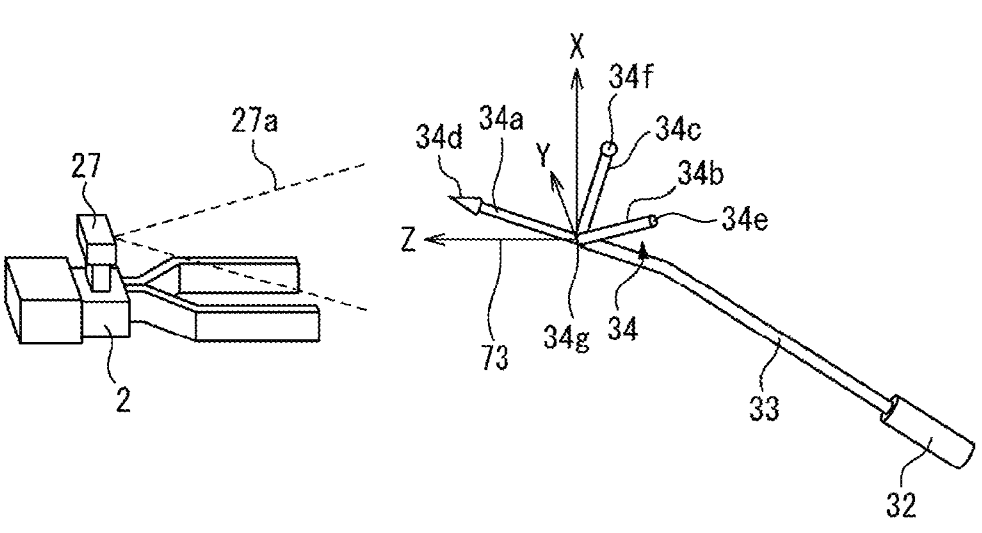
FIG. 6 is a perspective view of a teaching tool and a camera when an auxiliary coordinate system is set.

FIG. 6 illustrates a perspective view of the first teaching tool and the camera when the auxiliary coordinate system is set for the teaching tool. Referring to FIGS. 2 and 6, the processing unit 51 according to the present embodiment includes the feature portion detecting unit 52 configured to detect the positions of the feature portions **34*d* to 34*g* of the teaching tool 31. The processing unit 51 includes the coordinate system setting unit 53 configured to set an auxiliary coordinate system 73 to the teaching tool 31**.

The operator changes manually the position and the orientation of the robot 1 by using the teach pendant 3 such that an image of the instruction portion 34 in the teaching tool 31 can be captured. The operator arranges the teaching tool 31 such that the instruction portion 34 of the teaching tool 31 is arranged inside a capturing range **27*a* of the camera 27. The operator changes the position and the orientation of the teaching tool 31 such that an image of each of the feature portions 34*d* to 34*g* can be captured. The camera 27 captures the image of the instruction portion 34**.

Next, the feature portion detecting unit 52 detects the positions of the feature portions **34*d* to 34*g* of the teaching tool 31. In the present embodiment, distance images of the instruction portion 34 of the teaching tool 31 captured from various angles and various distances are stored in advance in the storage part 42**. These images are referred to as reference images.

The feature portion detecting unit 52 selects a reference image that best matches the image actually captured by the camera 27 from a plurality of the reference images. The feature portion detecting unit 52 detects the feature portions **34*d* to 34*g* by comparing the image actually captured by the camera 27 with the reference image by pattern matching. Next, the feature portion detecting unit 52 identifies the positions of the feature portions 34*d* to 34*g* in the actually captured image. The feature portion detecting unit 52 acquires the position information on the three-dimensional point of each of the feature portions 34*d* to 34*g*. The positions of the feature portions 34*d* to 34*g* can be detected in a camera coordinate system with a predetermined point in the camera 27 as the origin, for example. The camera coordinate system moves with the camera 27**.

The camera 27 is fixed to the hand 2. The relative position and the relative orientation of the camera coordinate system with respect to the tool coordinate system 72 are constant. The relative position and the relative orientation of the camera coordinate system with respect to the tool coordinate system 72 can be measured in advance. Based on the position and the orientation of the robot 1, the position expressed in the camera coordinate system can be converted to the position expressed in the world coordinate system 71. The feature portion detecting unit 52 can convert the position of the feature portion detected in the camera coordinate system to the position of the feature portion expressed in the world coordinate system 71.

The reference image may be created in advance by the operator using Computer Aided Design (CAD) data, or the like. The operator can, for example, generate the reference images of the instruction portion in various positions and orientations based on three-dimensional design data. Alternatively, two-dimensional reference images can be generated in advance. The feature portion detecting unit 52 may identify the position of the feature portion in the three-dimensional image by performing pattern matching based on the two-dimensional image acquired by one camera included in the stereo camera.

The coordinate system setting unit 53 then sets the auxiliary coordinate system 73 to the teaching tool 31. The method of setting the auxiliary coordinate system 73 can be predetermined. The coordinate system setting unit 53 according to the present embodiment sets the feature portion **34*g* at the origin of the auxiliary coordinate system 73. The coordinate system setting unit 53 also sets the axis from the origin of the auxiliary coordinate system 73 toward the optical center of the camera 27 as a Z-axis. The coordinate system setting unit 53 sets an axis, among the axes perpendicular to the Z-axis, which extends upward in the vertical direction when viewed from the camera 27 as an X-axis. In addition, the coordinate system setting unit 53** sets the direction perpendicular to the X-axis and Z-axis as a Y-axis.

Thus, the coordinate system setting unit 53 sets the direction from the origin of the auxiliary coordinate system 73 determined in the teaching tool 31 toward the camera 27 as one coordinate axis of the auxiliary coordinate system. The one coordinate axis may be the X-axis or the Y-axis. The robot controller 4 can automatically set the auxiliary coordinate system 73 by the operator capturing the image of the instruction portion 34 of the teaching tool 31 with the camera 27.

The method of setting the auxiliary coordinate system 73 is not limited to this configuration, and any method can be adopted. For example, the Z-axis may be set so as to overlap with the rod-like portion 34*a*. Additionally, the X-axis may be set so as to overlap with the rod-like portion 34*b* and the Y-axis may be set so as to overlap with the rod-like portion 34*c*. Alternatively, the operator may manually set the auxiliary coordinate system while viewing the image captured by the camera 27. The display part 3*b* of the teach pendant 3 can display the distance image captured by the camera 27. The operator can set the auxiliary coordinate system 73 for the teaching tool 31 by operating the input part 3*a*.

In the present embodiment, the origin of the auxiliary coordinate system is set to the teaching tool, but the embodiment is not limited to this. The origin of the auxiliary coordinate system may be far from the teaching tool. The operator may also arrange the position of the robot 1 at the position of the start teaching point TPS and arrange the teaching tool 31 so as to correspond to the position and the orientation of the robot 1 at the start teaching point TPS. After this, the operator may set the auxiliary coordinate system.

The coordinate system setting unit 53 then calculates the relative position and the relative orientation of the auxiliary coordinate system 73 with respect to the positions of the feature portions 34*d* to 34*g*. The storage part 42 stores the relative position and the relative orientation of the auxiliary coordinate system 73 with respect to the positions of the feature portions 34*d* to 34*g*. When the positions of the feature portions 34*d* to 34*g* are detected, the position and the orientation of the auxiliary coordinate system 73 can be calculated.

Figure 7:
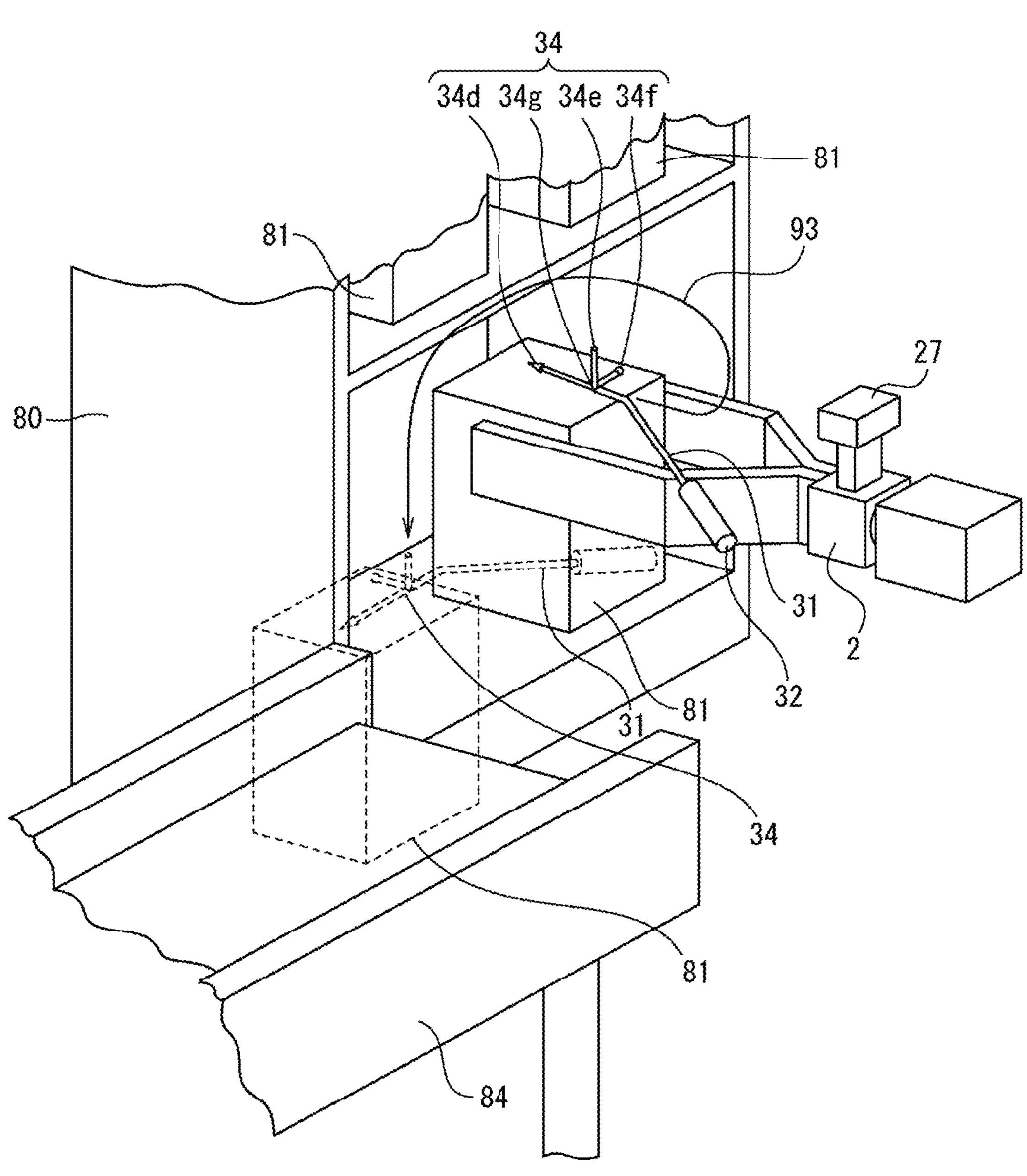
FIG. 7 is a perspective view of the teaching tool, the camera, and the workpiece, when the teaching point is set in a path mode according to an embodiment.

FIG. 7 illustrates a perspective view of the camera, the workpiece, and the teaching tool when the teaching point is set with the teaching tool of the present embodiment. The robot controller 4 of the present embodiment is formed such that a path mode in which the teaching points are set continuously when the operator moves the teaching tool 31, and a point mode in which the operator stops the teaching tool 31 and sets the teaching point, can be performed. First, the path mode will be described.

Referring to FIGS. 4 and 7, the operator changes the position and the orientation of the robot 1 and grips the workpiece 81 arranged on the shelf 80 with the hand 2. In other words, the position of the robot 1 is arranged at the position of the start teaching point TPS for conveying the workpiece 81. The operator arranges the teaching tool 31 so as to correspond to the position and the orientation of the robot 1 at the start teaching point TPS. The operator arranges the teaching tool 31 in a position where the camera 27 can capture the image of the instruction portion 34. In this example, the operator arranges the teaching tool 31 on the top surface of the workpiece 81. The operator also arranges the Z-axis direction of the coordinate system 72 substantially parallel to the extending direction of the rod-like portion 34*a* including the feature portion 34*d*.

The processing unit 51 acquires image captured by the camera 27. The feature portion detecting unit 52 detects the positions of the feature portions 34*d*, 34*e*, and 34*f* of the instruction portion 34. The calculating unit 55 calculates the position and the orientation of the auxiliary coordinate system 73 based on the positions of the feature portions 34*d*, 34*e*, and 34*f*. Next, the processing unit 51 calculates the relative position and the relative orientation of the tool coordinate system 72 with respect to the auxiliary coordinate system 73. The storage part 42 stores these initial relative position and relative orientation. The operator can set the relative position and the relative orientation of the tool coordinate system 72 with respect to the auxiliary coordinate system 73 when the hand 2 grips the workpiece 81 by any method. For example, the operator may enter the relative position and the relative orientation by operating the input part 3*a* of the teach pendant 3.

Figure 8:
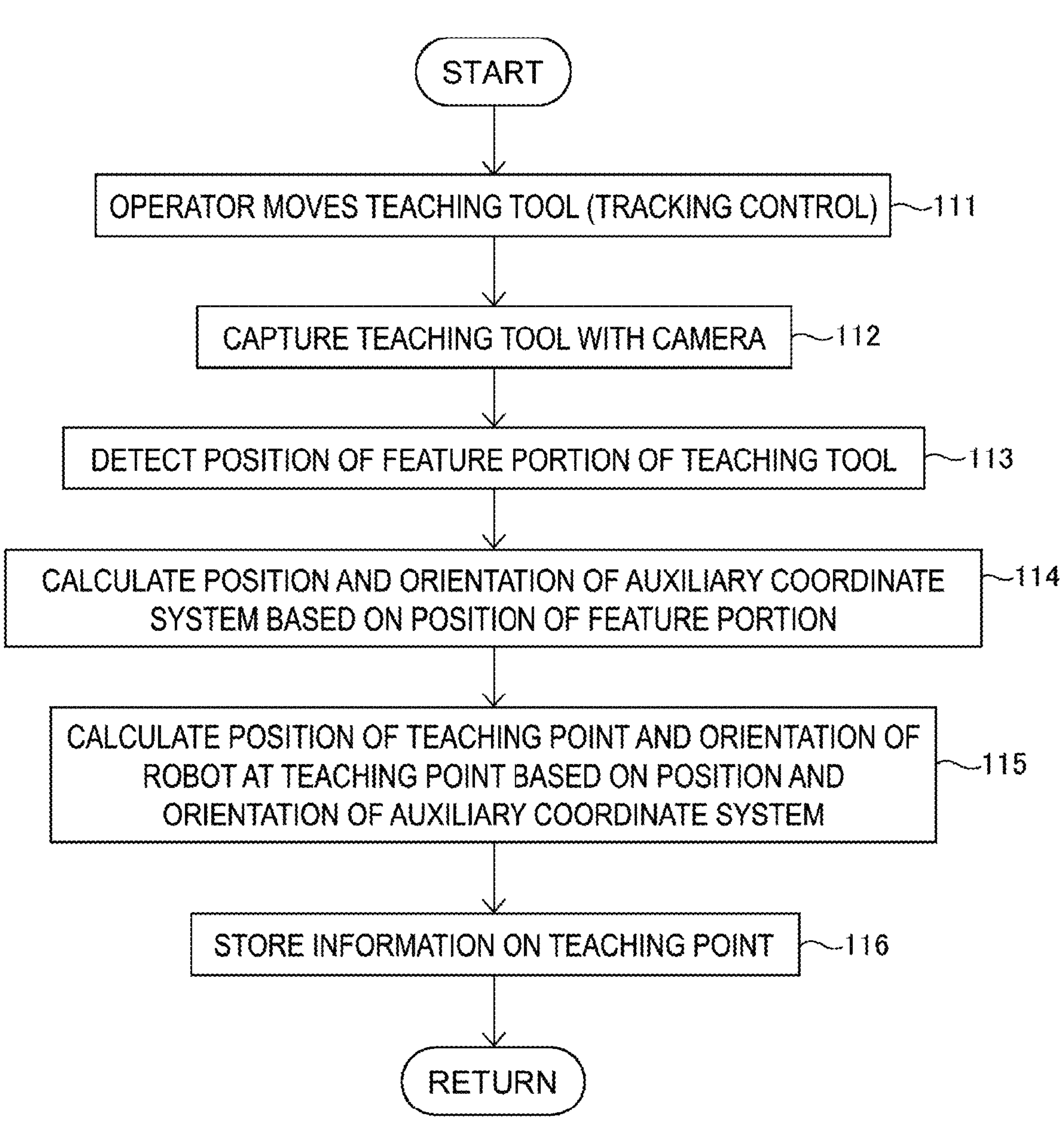
FIG. 8 is a flowchart of an operation for setting one teaching point.

FIG. 8 illustrates a flowchart of a control for setting one teaching point. Referring to FIGS. 2, 4 and 8, when setting the teaching point, the robot controller 4 drives based on the setting program 46. In step 111, the operator moves the teaching tool 31 in a path along the movement path 98. In the present embodiment, the position and the orientation of the robot 1 are changed such that the camera 27 moves in response to the movement of the teaching tool 31 by performing a tracking control described later.

In step 112, the camera 27 captures the instruction portion 34 of the teaching tool 31. In step 113, the feature portion detecting unit 52 detects the positions of the feature portions 34*d*, 34*e*, and 34*f* of the instruction portion 34 based on the image captured by the camera 27.

The relative position and the relative orientation of the auxiliary coordinate system 73 with respect to the positions of the feature portions 34*d* to 34*g* have been calculated in the coordinate system setting unit 53. In step 114, the calculating unit 55 calculates the position and the orientation of the auxiliary coordinate system 73 based on these relative position and relative orientation.

The relative position and the relative orientation of the tool coordinate system 72 with respect to the auxiliary coordinate system 73 have been measured in advance. In step 115, the setting unit 56 calculates the position and the orientation of the tool coordinate system 72 (position of the teaching point and the orientation of the robot at the teaching point) based on these relative position and relative orientation. Thus, the setting unit 56 sets the teaching point so as to include information on the position of the teaching point and the orientation of the robot at the teaching point, based on the position and the orientation of the auxiliary coordinate system 73 detected in calculating unit 55.

In step 116, the storage part 42 stores information on the teaching point. In this way, the teaching point can be set by capturing, with the camera 27, the image of the teaching tool 31 arranged by the operator.

The robot apparatus 8 of the present embodiment performs, when the operator moves the teaching tool 31, a tracking control in which the position and the orientation of the robot 1 change such that the image of the instruction portion 34 can be captured by the camera 27. In the tracking control, the position and the orientation of the robot 1 are changed so as to maintain the relative position and the relative orientation of the camera 27 with respect to the feature portions 34*d*, 34*e* and 34*f*. In the present embodiment, since the camera 27 is fixed to the hand 2, the position and the orientation of the robot 1 are changed such that the relative position and the relative orientation of the tool coordinate system 72 with respect to the auxiliary coordinate system 73 is maintained.

Referring to FIG. 7, the operator moves the teaching tool 31 along the desired movement path as illustrated by an arrow 93. In the tracking control, the camera 27 captures an image at a predetermined minute time interval. For example, images may be captured every control period of the robot 1. The feature portion detecting unit 52 detects the positions of the feature portions 34*d*, 34*e*, and 34*f*. The calculating unit 55 detects the position and the orientation of the auxiliary coordinate system 73 based on the positions of the feature portions 34*d*, 34*e*, 34*f*.

The movement command generation unit 54 obtains from the storage part 42 the relative position and the relative orientation of the tool coordinate system 72 with respect to the auxiliary coordinate system 73 when the teaching tool 31 is arranged at the position corresponding to the start teaching point TPS. Based on these relative position and relative orientation, and the position and the orientation of the auxiliary coordinate system 73, the movement command generation unit 54 calculates the position and the orientation of the robot 1. The movement command generation unit 54 sends, to the operation control unit 43, a command for the robot 1 so as to achieve these position and orientation of the robot 1.

Thus, when the operator moves the teaching tool 31, the movement command generation unit 54 changes the position and the orientation of the robot 1 such that the position and the orientation of the camera 27 track with respect to the feature portions 34*d*, 34*e*, and 34*f*. In the tracking control, various controls can be performed. For example, the position and the orientation of the robot can be changed such that the relative position and the relative orientation of the tool coordinate system or the camera coordinate system with respect to the feature portions are maintained. In the path mode in which teaching points are set continuously, the tracking control can be performed during the period in which the teaching points are set.

Referring to FIGS. 4 and 7, when performing the path mode, the operator switches to the path mode by operating the input part 3*a* of the teach pendant 3. The operator manually sets the start teaching point TPS. The operator moves the teaching tool 31 along the movement path 98 from the position corresponding to the start teaching point TPS as illustrated by the arrow 93. The tracking control automatically changes the position and the orientation of the robot 1 such that the camera 27 can capture the image of the instruction portion 34 of the teaching tool 31.

The processing unit 51 sets a teaching point TP at a predetermined interval with the movement of the teaching tool 31. The processing unit 51 sets a teaching point TP with the control illustrated in FIG. 8. The processing unit 51 may set the teaching point at a predetermined time interval or a predetermined interval of a movement distance of the teaching tool 31. The feature portion detecting unit 52 detects the positions of the feature portions 34*d*, 34*e*, and 34*f* at each of the interval. The calculating unit 55 calculates the position and the orientation of the auxiliary coordinate system 73 based on the positions of the feature portions 34*d*, 34*e*, and 34*f* detected at each of the interval. The setting unit 56 sets the position of the teaching point TP and the orientation of the robot 1 at the teaching point TP so as to correspond to the interval.

When the teaching tool 31 moves to the position corresponding to the end teaching point TPE, the operator operates the input part 3*a* of the teach pendant 3, and thus the processing unit 51 sets the end teaching point TPE and finishes the path mode. In this way, a plurality of teaching points TP can be set automatically during the period when the operator is moving the teaching tool 31.

In the path mode, the operator does not have to operate the teach pendant each time the teaching point is set, but can automatically set a plurality of the teaching points. In addition, many teaching points can be set at a minute interval. The path mode is suitable for a robot apparatus that performs an operation in a path in which the tool center point moves in a curved shape, as in the movement path of the present embodiment.

Next, a mode for setting teaching points one by one will be described for the point mode. In the point mode, an operator operates the teach pendant 3 each time a teaching point is set. The relative position and the relative orientation of the tool coordinate system 72 with respect to the auxiliary coordinate system 73 is acquired in the same way as the path mode described above, when the teaching tool 31 is arranged at a position corresponding to a predetermined position such as the start teaching point TPS.

The operator switches the robot controller 4 to the point mode by operating the teach pendant 3. Next, the teaching point is set by performing the operation of step 111 to step 116 in FIG. 8. In step 111, when the operator moves the teaching tool 31 so as to perform the tracking control, the position and the orientation of the robot 1 are automatically changed such that the image of the instruction portion 34 can be captured by the camera 27. By the operator operating the teach pendant 3, the processing unit 51 performs the control of step 112 to step 116. A plurality of teaching points are set by repeating the arrangement of the teaching tool 31 by the operator and the setting of the teaching points by the robot controller 4.

Figure 9:
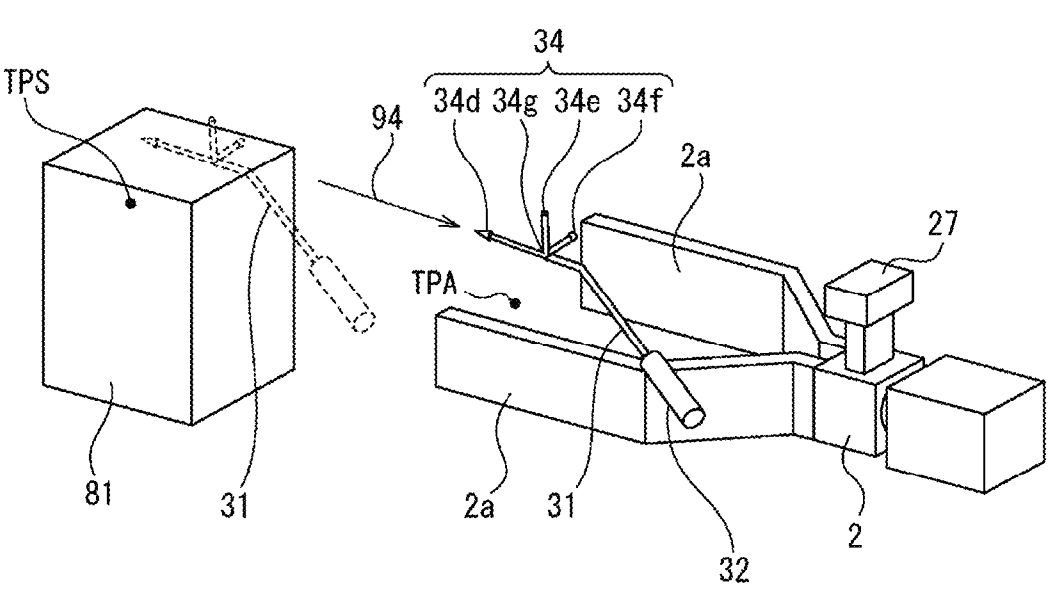
FIG. 9 is a perspective view of the teaching tool, the camera, and the workpiece, when the teaching point is set in a point mode according to an embodiment.

FIG. 9 illustrates a perspective view of the workpiece, the camera, and the teaching tool in setting the teaching point, which is an approach point. The robot apparatus 8 arranges the tool center point at a teaching point TPA near the start teaching point TPS before starting the actual operation. In the real operation, the robot apparatus 8 performs a control for moving the hand 2 from the teaching point TPA closer to the start teaching point TPS. In the teaching point TPA, the hand 2 is in an opened state. When the position of the robot 1 is arranged at the start teaching point TPS, the hand 2 performs control of closing. The teaching point TPA near such the start teaching point TPS is referred to as an approaching point.

The teaching of the teaching point TPA can be performed in the point mode. In addition, the tracking control can be performed. When the operator moves the teaching tool 31, the movement command generation unit 54 changes the position and the orientation of the robot 1 such that the camera 27 tracks the movement of the teaching tool 31. It is not necessary for the operator to adjust the position and the orientation of the robot 1 for each setting of one teaching point by performing the tracking control, and the operator can easily set the teaching point.

After setting the start teaching point TPS, the operator moves the teaching tool 31 to a position away from the workpiece 81 as illustrated by an arrow 94. With the tracking control, the hand 2 to which the camera 27 is fixed moves in response to the movement of the teaching tool 31. By the operator operating the teach pendant 3 when the teaching tool 31 is arranged at the desired position, the processing unit 51 can set the teaching point TPA.

Furthermore, when the actual operation is finished, the robot apparatus 8 arranges the tip point of the hand 2 to a position away from the workpiece 81. The robot controller 4 arranges the position of the robot 1 at the teaching point retracted from the end teaching point TPE. After this, the robot controller 4 changes the position and the orientation of the robot 1 in order to perform the next operation. This teaching point is referred to as a relief point. The teaching point which serves as the relief point can also be set in the point mode as well as the approach point.

In the point mode, the operator can stop the teaching tool 31 when setting one teaching point. The operator can finely adjust the position and the orientation of the teaching tool 31. Accordingly, in the point mode, the position and the orientation of the robot at the teaching point can be finely adjusted. In addition, when the position of the robot moves in a straight line, or the like, the movement path is simple. When the movement path is simple, fewer teaching points need only to be set. In this case, the operator can set the teaching points in a short time by setting the teaching points in the point mode.

In the robot controller 4 according to the present embodiment, setting of the teaching point can be performed by switching between the point mode and the path mode. Furthermore, in setting the teaching point, a condition for driving the operation tool can be set. For example, in a hand in which the claw part is driven by a motor, the operator can set the condition such as the magnitude of a force for gripping the workpiece by the hand. When the operator operates the teach pendant 3 and sets the point mode or the path mode, the operator can input the condition for driving the operation tool. The storage part 42 can store the condition for driving the operation tool, along with information on the teaching points to be set. The robot controller 4 can generate the work program 41 based on the information on the teaching point and the condition for driving the operation tool.

When the robot apparatus 8 performs the actual operation, the operation control unit 43 can control the position and the orientation of the robot by various methods of moving the tool center point. For example, the operation control unit 43 can perform a first movement control for controlling the position and the orientation of the robot 1 such that the tool center point passes through the teaching points and moves in a straight line between the teaching points. The operation control unit 43 can also perform a second movement control for controlling the position and the orientation of the robot 1 such that the tool center point passes through the teaching points and moves in a curved shape between the teaching points. The operation control unit 43 can also perform a third movement control for controlling the position and the orientation of the robot such that the tool center point passes through the teaching points or the vicinity of the teaching points and moves in a curved shape. In the third movement control, the tool center point does not have to pass through the teaching point, and the operation tool moves in a smooth movement path.

The operator can specify any of the movement controls from the first movement control to the third movement control when setting the teaching point. For example, the operator can specify the type of movement control by operating the teach pendant 3. The storage part can store the type of movement control along with the information on the teaching points being set. The robot controller 4 can generate the work program 41 based on the information on the teaching points and the type of movement control.

It should be noted that the point mode can be used in a case where discrete teaching points are set. In the point mode, it is preferable to generate command statements of a work program, which changes the position and the orientation of the robot in the first movement control. On the other hand, the path mode can be used when the operation tool performs the operation continuously while the position and the orientation of the robot changes. In the path mode, it is preferable to generate command statements of a work program, which changes the position and the orientation of the robot in the second movement control or the third movement control.

In the previously described embodiment, an operator opens and closes the hand 2 by operating the input part 3*a* of the teach pendant 3. Alternatively, the operator switches between the point mode and the path mode by operating the input part 3*a* of the teach pendant 3. In the robot controller 4 according to the present embodiment, such a command can be performed by the action of the teaching tool 31. In other words, instead of operating the input part 3*a* of the teach pendant 3, the input to the teach pendant 3*a* can be performed by the action of the teaching tool 31.

Figure 10:
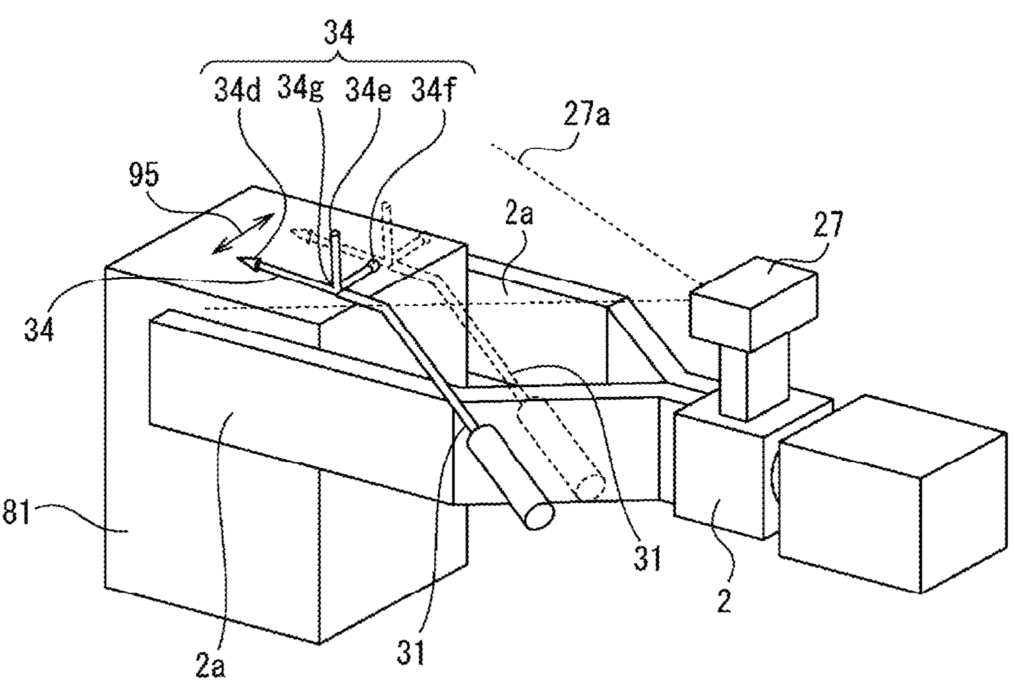
FIG. 10 is a perspective view of the teaching tool and the camera, which illustrates a first command action of the teaching tool.

FIG. 10 is a perspective view of the teaching tool and the camera when a command is performed to the processing unit by the action of the teaching tool. Referring to FIGS. 2 and 10, the processing unit 51 includes an action detecting unit 57 configured to detect a predetermined command action of the teaching tool 31 based on the output of the camera 27. The action detecting unit 57 corresponds to a processor driven according to the setting program 46. The processor reads the setting program 46 and functions as the action detecting unit 57 by performing the control specified in the setting program 46.

The action detecting unit 57 acquires the position of at least one of the feature portions 34*d* to 34*g* from the feature portion detecting unit 52 at a predetermined time interval. The action detecting unit 57 detects movement of the feature portions 34*d* to 34*g*. The action detecting unit 57 detects the predetermined action of the teaching tool 31. In the present embodiment, the action of the teaching tool 31 for commanding the robot controller 4 is referred to as a command action. In the example illustrated in FIG. 10, the operator performs a command action for moving the teaching tool 31 in a small reciprocating movement in any direction as illustrated by an arrow 95. In this example, the operator moves the teaching tool 31 in the extending direction of the rod-like portion 34*c* in which the feature portion 34*f* is arranged.

The action detecting unit 57 detects the command action based on the position of the feature portion 34*d* detected by the feature portion detecting unit 52. For example, the action detecting unit 57 detects the movement of the feature portion 34*d* in one direction and in the direction opposite to the one direction within a predetermined time. When such an action is detected, the action detecting unit 57 determines that the action is a predetermined command action and performs control corresponding to the command action. The control corresponding to such the command action is predetermined.

For example, the action detecting unit 57 determines that the command action is a command for closing the hand 2. The storage part 42 stores the command of the operation for closing the hand 2 along with the current information on the teaching point. The robot controller 4 can generate the work program 41 including the command for closing the hand 2 along with the information on the teaching points.

Alternatively, when setting of the teaching point in the point mode is performed, the action detecting unit 57 may determine that the command action is a command for storing the teaching point, instead of the operation of the teach pendant by the operator. The calculating unit 55 and the setting unit 56 acquire the position and the orientation of the teaching tool 31 before the reciprocating motion illustrated by the arrow 95 is performed. The calculating unit 55 and the setting unit 56 set the teaching point based on this position and orientation.

Alternatively, in the path mode, the operator may perform the command action after arranging the teaching tool 31 corresponding to the start teaching point TPS. The action detecting unit 57 can determine this action to be a command for setting the start teaching point TPS in the path mode. The operator then moves the teaching tool 31 from the position corresponding to the start teaching point TPS to the position corresponding to the end teaching point TPE. The calculating unit 55 and the setting unit 56 automatically set a plurality of teaching points based on the position and the orientation in which the teaching tool 31 is arranged. In the teaching of the end teaching point TPE, the command action is performed after the teaching tool 31 reaches the end teaching point TPE. The calculating unit 55 and the setting unit 56 can set the end teaching point TPE based on the position and the orientation of the teaching tool 31 immediately before the command action is performed.

Figure 11:
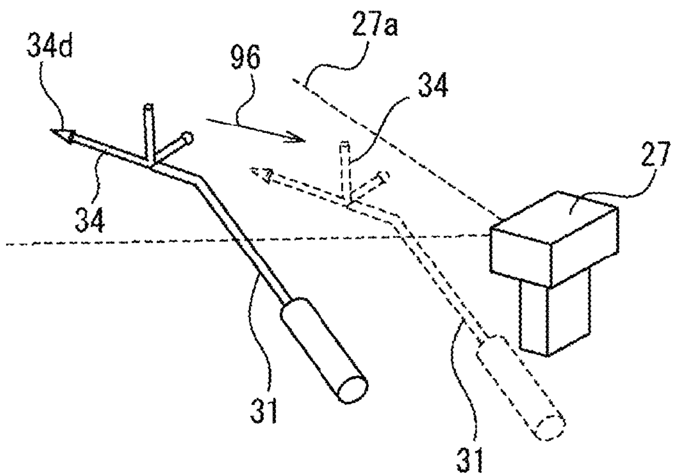
FIG. 11 is a perspective view of the teaching tool and the camera, which illustrates a second command action of the teaching tool.

FIG. 11 illustrates a perspective view of the teaching tool and the camera, which illustrates another command action of the teaching tool. In another command action, the instruction portion 34 of the teaching tool 31 may be rapidly brought closer to the camera 27 as illustrated by an arrow 96. For example, the action detecting unit 57 can determine the case, where the feature portion **34*d* moves closer to the camera 27 within a range of a predetermined distance within a predetermined time, to be a command action. Alternatively, the action detecting unit 57 determines the case, where the feature portion 34*d* moves toward the camera 27** by a distance greater than a predetermined determination value of distance within a predetermined time, to be a command action.

Even for a case where the command action illustrated in FIG. 11 is detected, the action detecting unit 57 can determine the case to be a command for a predetermined control. For example, the action detecting unit 57 can switch between the point mode and the path mode. In other words, the path mode and the point mode can be switched by the operator rapidly moving closer the instruction portion 34 toward the camera 27 as illustrated by the arrow 96.

Thus, in the robot controller 4 of the present embodiment, the robot controller 4 can be commanded by the predetermined command action of the teaching tool. The operator can command the robot controller 4 without operating the teach pendant 3. Accordingly, the teaching work can be performed quickly.

The command action is not limited to the above configuration, and any action can be adopted. For example, as a command action, the operator can arrange the instruction portion outside the capturing range of the camera and then return it inside the capturing range in a short time period. Alternatively, as a command action, the teaching tool can be moved such that one feature portion moves in a circle.

Figure 12:
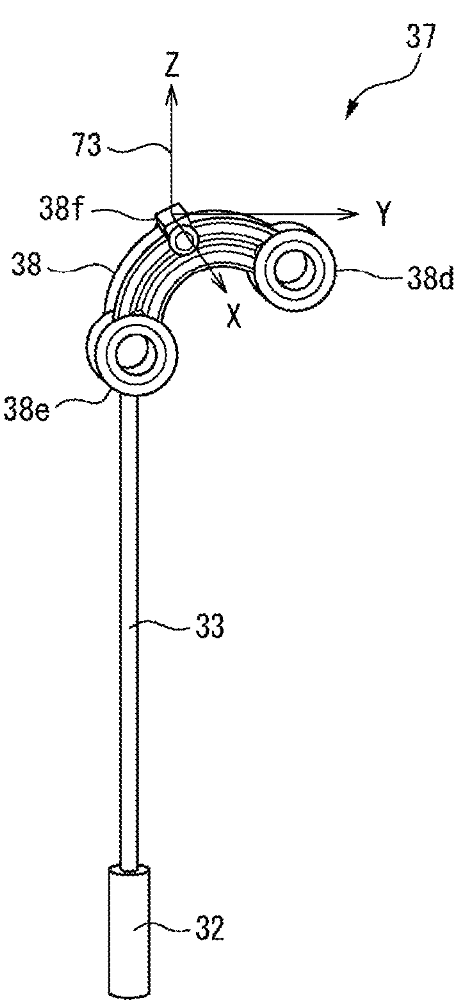
FIG. 12 is a perspective view of a second teaching tool according to an embodiment.

FIG. 12 illustrates a perspective view of a second teaching tool according to the present embodiment. The teaching tool is not limited to the above configuration, but can have any shape that allows the position and the orientation of the instruction portion of the teaching tool to be detected by an image captured by the camera. A second teaching tool 37 includes the gripping portion 32 that is a hand-held part, and the supporting portion 33 that extends from the gripping portion 32 in a rod-like shape. An instruction portion 38 is arranged at the end portion of the supporting portion 33.

The instruction portion 38 of the second teaching tool 37 includes feature portions **38*d*, 38*e*, and 38*f*. The feature portions 38*d* and 38*e* are formed in an annular shape. A feature portion 38*f*** is formed to protrude from the side surface.

In the second teaching tool 37, similarly to the first teaching tool 31, the feature portion detecting unit 52 detects the positions of the feature portions **38*d* to 38*f* based on the three-dimensional information acquired by the camera 27. The coordinate system setting unit 53 sets the auxiliary coordinate system 73 for the teaching tool 37. The origin of the auxiliary coordinate system 73 can be arranged, for example, at the feature portion 38*f*. The coordinate system setting unit 53 can calculate the relative position and the relative orientation of the auxiliary coordinate system 73 with respect to the feature portions 38*d*, 38*e* and 38*f*. Next, the operator arranges the teaching tool 37 at a desired position and orientation with respect to the operation tool and captures an image with the camera 27. The processing unit 51 calculates the relative position and the relative orientation of the operation tool with respect to the auxiliary coordinate system 73 (relative position and relative orientation of the tool coordinate system 72) based on the image of the camera 27. For other operations, the teaching points can be set by performing the similar operations as for the first teaching tool 31**.

Figure 13:
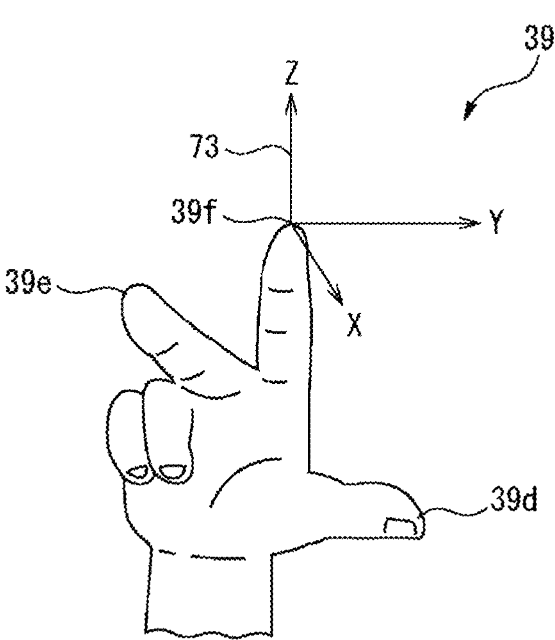
FIG. 13 is a perspective view of a hand of an operator.

FIG. 13 illustrates a perspective view of the hand of the operator according to the present embodiment. In the above embodiments, the position and the orientation of the operation tool are specified with respect to the workpiece by using the first teaching tool 31 or the second teaching tool 37, but the embodiment is not limited to this. The operator may use the hand 39 and specify the position and the orientation of the operation tool.

In the example illustrated in FIG. 13, the thumb, the index finger and the middle finger generate the shape of the hand 39 in such a way that they point to respective directions approximately perpendicular to each other. The tip portion of the thumb is set to a feature portion **39*d*. The tip portion of the index finger is set to a feature portion 39*f*. In addition, the tip portion of the middle finger is set to a feature portion 39*e*. The shape of the hand 39 of the operator is not limited to this shape, and the position and the orientation of the operation tool can be specified by any shape that allows the feature portion to be detected. The operator can specify the position and the orientation of the operation tool while maintaining the shape of the hand 39**.

The auxiliary coordinate system 73 can be set for the hand 39 of the operator in the same way as the teaching tools 31 and 37. For example, the coordinate system setting unit 53 can automatically set the auxiliary coordinate system 73 based on a distance image of the hand 39 of the operator captured with the camera 27. In the example here, the origin of the auxiliary coordinate system 73 is set to the feature portion **39*f*** at the tip portion of the index finger.

Other controls for setting teaching points are similar to those for setting teaching points by using the teaching tool. In the teaching apparatus of the present embodiment, the teaching work of the robot apparatus can be performed even by the operator using the hand instead of the teaching tool.

Figure 14:
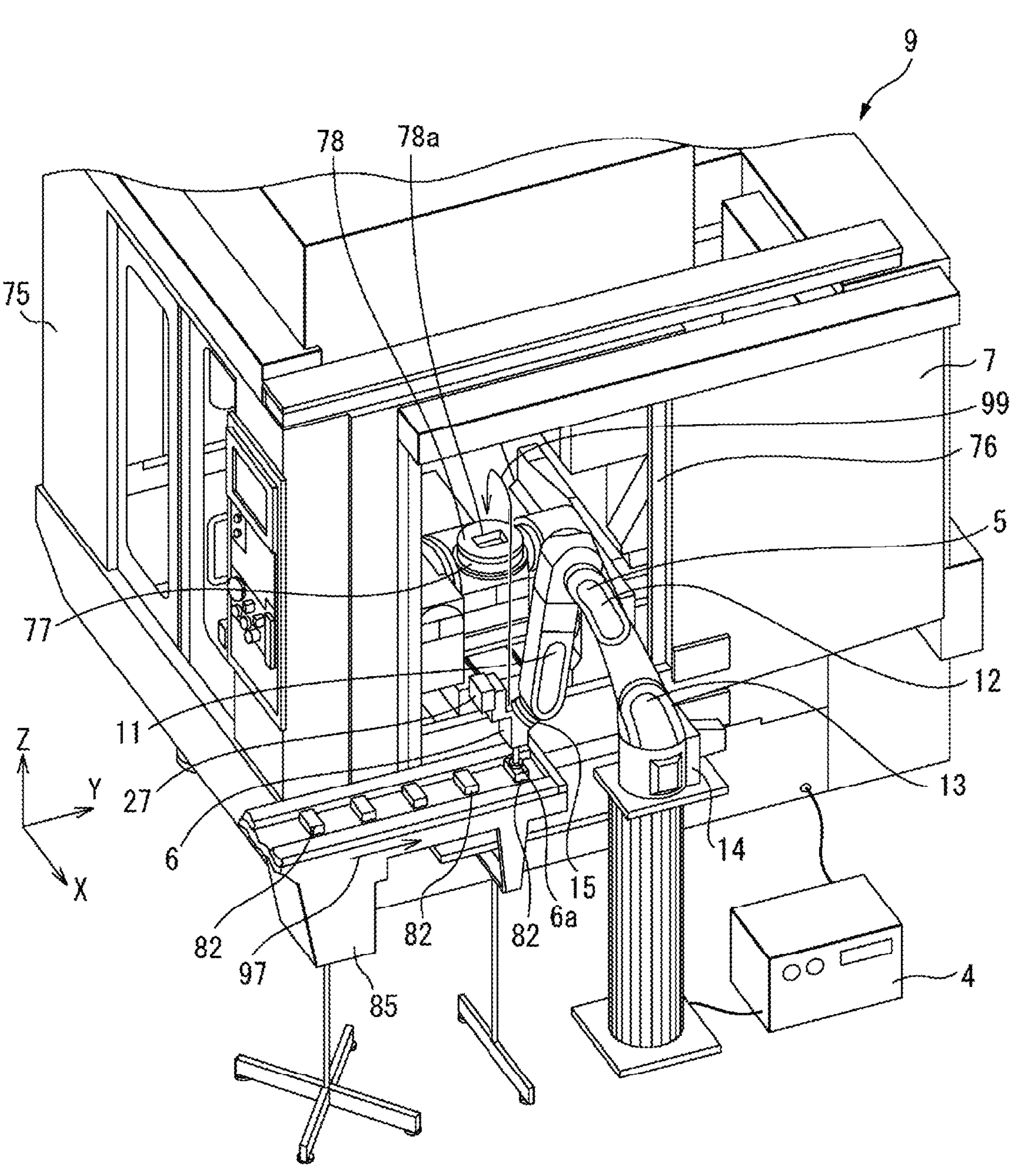
FIG. 14 is a perspective view of a second robot apparatus according to an embodiment.

FIG. 14 illustrates a perspective view of a second robot apparatus according to the present embodiment. A second robot apparatus 9 includes a robot 5 and a machine tool 7. In the robot apparatus 9 of the present embodiment, a workpiece 82 machined by the machine tool 7 is replaced by the robot 5. The robot apparatus 9 includes the robot 5 and a hand 6. The hand 6 includes a suction pad 6*a* configured to grip the workpiece 82 by adsorption. The camera 27 that is a stereo camera is fixed to the hand 6.

The robot apparatus 9 includes a conveyor 85 configured to convey the workpiece 82. The conveyor 85 conveys a plurality of the workpieces 82 as illustrated by an arrow 97. The conveyor 85 conveys the workpiece 82 to a position where the hand 6 can grip the workpiece 82.

The machine tool 7 of the present embodiment is numerically controlled type. The machine tool 7 can automatically machine the workpiece 82 based on a machining program created in advance. The machine tool 7 includes a door 76 arranged on the side surface of a frame body 75. The door 76 opens and closes. In the machining chamber surrounded by the frame body 75, the spindle head to which a tool is mounted and a table 77 that supports the workpiece 82, are arranged. A fixing member 78 at which the workpiece 82 is arranged is fixed to the table 77. The workpiece 82 is arranged in a recess 78*a* of the fixing member 78. During the machining of the workpiece 82, at least one of the spindle head and the table 77 moves to change the relative position of the tool with respect to the workpiece 82. The workpiece 82 is machined to a desired shape.

The robot 5 arranges the unmachined workpiece 82 on the fixing member 78 and removes the machined workpiece 82 from the fixing member 78. During the replacement period for the workpiece 82, the door 76 is in an open state. The workpiece 82 conveyed by the conveyor 85 is arranged by the robot 5 at the fixing member 78 inside the machining chamber as illustrated by an arrow 99. At this time, the robot 5 inserts the upper arm 11 and the lower arm 12 into the machining chamber through the opening. When performing the teaching work, the operator must check the position and the orientation of the hand 6 from outside the machining chamber. Accordingly, the position and the orientation of the hand 6 may be difficult to be viewed.

However, in the teaching apparatus of the present embodiment, since the teaching point can be set by using the teaching tool or the hand, the operator can easily specify the position and the orientation of the robot 5. In particular, by using the teaching tool, the operator can specify the position and the orientation of the robot, in a state where the operator stands outside the machining chamber. Accordingly, the teaching work can be performed in a short time.

In the present embodiment, a robot apparatus that conveys a workpiece and a robot apparatus that machines a workpiece are used as examples, but the embodiment is not limited to this. The control of the present embodiment can be applied to a robot apparatus that performs any operation. For example, the control according to the present embodiment can be applied to a robot apparatus including an operation tool configured to apply an adhesive or a robot apparatus including a laser head configured to perform laser machining, or the like.

In the above embodiments, the teaching tool or the hand of the operator is used to designate the position at which the operation is to be performed. As a method of designating the position where the operation is to be performed, a sticker printed with a character or a symbol or the like can be pasted to the workpiece as a two-dimensional marker. Then, by detecting the position of the two-dimensional marker with the camera, the position of the teaching point can be set. The robot moves the camera so as to capture an image of its surroundings. The teaching apparatus then searches for the marker from the image by the camera. When the two-dimensional marker is searched, the position of the two-dimensional marker can be set as the position of the teaching point.

The above embodiments can be combined as appropriate. In each of the above drawings, the same or equivalent parts are denoted by the same sign. The above embodiments are examples and do not limit the invention. The embodiments include modifications of the embodiments described in the claims.

REFERENCE SIGNS LIST

1, 5 robot
2, 6 hand
4 robot controller
8, 9 robot apparatus
27 camera
31, 37 teaching tool
32 gripping portion
34, 38 instruction portion
34*a*, 34*b*, 34*c* rod-like portion
34*d*, 34*e*, 34*f*, 34*g* feature portion
38*d*, 38*e*, 38*f* feature portion
39 hand
39*d*, 39*e*, 39*f* feature portion
42 storage part
51 processing unit
52 feature portion detecting unit
53 coordinate system setting unit
54 movement command generation unit
55 calculating unit
56 setting unit
57 action detecting unit
73 auxiliary coordinate system
81, 82 workpiece
98 movement path
TP, TPA teaching point
TPS start teaching point
TPE end teaching point

The invention claimed is:

1. A teaching apparatus configured to set a teaching point of a robot apparatus including a robot and an operation tool, comprising:

a three-dimensional sensor configured to capture an image of a teaching tool or an image of a hand of an operator for indicating a position of a teaching point and an orientation of the robot at the teaching point; and a processing apparatus including a processor and configured to process a signal from the three-dimensional sensor, wherein the processor is configured to detect a position of a feature portion in the teaching tool or the hand of the operator based on the output of the three-dimensional sensor, generate a command for changing a position and an orientation of the robot such that the three-dimensional sensor physically moves with the teaching tool or the hand while maintaining a relative position and a relative orientation of the three-dimensional sensor with respect to the feature portion when the operator moves the teaching tool or the hand, calculate a position and an orientation of an auxiliary coordinate system preset in the teaching tool or the hand of the operator based on a position of the feature portion detected by the processor in a state where the operator arranges the teaching tool or the hand so as to correspond to the position and the orientation of the robot at the time when the robot apparatus performs an operation, and set a position of a teaching point and an orientation of the robot at the teaching point based on the position and the orientation of the auxiliary coordinate system calculated by the processor.

2. The teaching apparatus of claim 1, further comprising the teaching tool, wherein the teaching tool includes a gripping portion configured for the operator to grip, and an instruction portion including the feature portion, and the instruction portion has a three-dimensional shape that enables a position and an orientation of the instruction portion to be detected based on the output of the three-dimensional sensor.

3. The teaching apparatus of claim 1, wherein the processor is further configured to set the auxiliary coordinate system to the teaching tool or the hand of the operator based on the position of the feature portion detected by the processor, and set a direction from the origin of the auxiliary coordinate system defined in the teaching tool or the hand of the operator toward the three-dimensional sensor, to one coordinate axis of the auxiliary coordinate system.

4. The teaching apparatus of claim 1, wherein the processor is further configured to detect a command action predetermined for the teaching tool, based on the output of the three-dimensional sensor, and perform control corresponding to the command action when the command action is detected.

5. The teaching apparatus of claim 1, wherein the processor is further configured to detect the position of the feature portion at a predetermined interval, along with the movement of the teaching tool or the hand by the operator, calculate the position and the orientation of the auxiliary coordinate system based on the position of the feature portion detected at the interval, and set the position of the teaching point and the orientation of the robot at the teaching point so as to correspond to the interval.

6. The teaching apparatus of claim 1, wherein in a tracking control in which the three-dimensional sensor physically moves with the teaching tool or the hand while maintaining the relative position and the relative orientation of the three-dimensional sensor with respect to the feature portion, the processor is configured to change the position and the orientation of the robot while maintaining a relative position and a relative orientation of a tool coordinate system of the operation tool with respect to the auxiliary coordinate system when the operator moves the teaching tool or the hand.

* * * * *